No. 748,375. Patented December 29, 1903.

UNITED STATES PATENT OFFICE.

EDUARD HEPP, OF FRANKFORT-ON-THE-MAIN, AND CHRISTOPH HARTMANN, OF HÖCHST-ON-THE-MAIN, GERMANY, ASSIGNORS TO FARBWERKE, VORM. MEISTER, LUCIUS & BRÜNING, OF HÖCHST-ON-THE-MAIN, GERMANY, A CORPORATION OF GERMANY.

BLUE ANTHRAQUINONE DYE AND PROCESS OF MAKING SAME.

SPECIFICATION forming part of Letters Patent No. 748,375, dated December 29, 1903.

Application filed August 28, 1903. Serial No. 171,124. (Specimens.)

*To all whom it may concern:*

Be it known that we, EDUARD HEPP, Ph.D., residing at Frankfort-on-the-Main, and CHRISTOPH HARTMANN, Ph. D., residing at Höchst-on-the-Main, Germany, citizens of the Empire of Germany, have invented certain new and useful Improvements in Blue Anthraquinone Dyes and Processes of Making Same, of which the following is a specification.

We have shown in our United States Patent No. 734,866 that by nitrating the anthraquinone-ortho-sulfo-acid and then reducing the products thus obtained two amidoanthraquinone sulfo-acids are produced, which were proved to be 1:5 and 1:8 derivatives.

We now have found that the corresponding 1:5 and 1:8 amidoöxyanthraquinones, which may be prepared by heating the 1:5 and 1:8 amidoanthraquinone sulfo-acids with alkalies or alkaline earths, can be easily transformed into very valuable coloring-matters. In order to obtain the said coloring-matters, the amidoöxyanthraquinones are treated with halogens, such as bromin. The new hologen derivatives thus obtained are condensed with aromatic amins—such as analin, ortho or para toluidin, xylidin, or the like—and, finally, the resulting condensation products are transformed into dyestuff solfonic acids by the action of sulfonating agents. The new coloring-matters thus obtained dye chrome mordanted or unmordanted wool fast-blue shades.

In practically carrying out our process we proceed, for instance, as follows, the parts being by weight: Into an aqueous suspension heated to about 60° centigrade of ten parts, by weight, of 1:5 or 1:8 amidoöxyanthraquinone or mixture thereof are slowly run thirty parts, by weight, of bromin and the mixture finally heated for a short time to 100° centigrade. The brominated amidoöxyanthraquinone is filtered and dried. It is a brown-red to orange-red powder, insoluble in water and soluble with great difficulty in most indifferent solvents. In concentrated sulfuric acid it is soluble, with a yellow to red-orange color, which becomes redder on addition of boric acid, especially if heated.

To produce the condensation product with anilin, the bromin derivative is heated in a reflux apparatus with five times the quantity of anilin until no further formation of the dyestuff is noticeable. The original orange color of the solution then turns from a dirty olive-brown to a pure blue. The dyestuff is separated by addition of alcohol as dark crystals. It yields with concentrated sulfuric acid a green solution, which becomes blue on adding boric acid. The dyestuff is soluble with great difficulty in most indifferent solvents and crystallizes from pyridin or chlorobenzene in dark-blue needles. It is soluble in anilin with a pure-blue color. To produce the sulfo-acid, ten parts, by weight, of the dry condensation product are slowly introduced into fifty parts, by weight, of fuming sulfuric acid of ten per cent. $SO_3$ and the mixture is allowed to stand at ordinary temperature until a test portion of it poured into water is completely soluble in dilute alkali. The mass is then poured into water and the dyestuff precipitated with common salt. It is soluble in water with a pure-blue color. The solution in concentrated sulfuric acid is of a pure blue and becomes blue-green when heated with boric acid. The dyestuff yields on unmordanted wool pure-blue shades.

In the same manner we proceed, for instance, to produce the condensation product with para-toluidin. It has the same behavior toward solvents as the above-described anilin derivative. The sulfo-acid, obtained in the usual manner, dies wool in somewhat greener shades. The solution in concentrated sulfuric acid is green-blue and becomes blue-green on adding boric acid.

The new coloring-matter dyes unmordanted and chrome-mordanted wool fast blue shades. When dry and pulverized, it is a dark-blue powder, easily soluble in water, with a pure-blue color, which becomes blue-violet on adding carbonate of soda or of caustic soda. It is easily precipitated from its aqueous solution with common salt or dilute mineral acids. It is dissolved by concentrated sulfuric acid to a blue color, changed into red by a small quantity of water, while by a larger quantity of water a blue precipitate is separated out.

Having now described our invention, what we claim is—

1. The herein-described process for producing new anthraquinone dyestuffs, which consists in first treating amidoöxyanthraquinones with halogens, secondly heating the halogen derivatives thus obtained with an aromatic amine, and finally transforming the resulting condensation products into sulfo-acids by the action of sulfonating agents, substantially as set forth.

2. The herein-described process for producing a new anthraquinone dyestuff, which consists in treating the 1:5-amidoöxyanthraquinone with bromin, heating the halogen derivatives thus obtained with anilin and finally transforming the resulting condensation product into a sulfo-acid by the action of feeble fuming sulfuric acid, substantially as set forth.

3. As new products, the anthraquinone dyestuffs obtainable by sulfonating the condensation products of halogenized amidoöxyanthraquinones, which dyestuffs, when dry and pulverized, are easily soluble in water with a blue color, dyeing unmordanted and chrome-mordanted wool fast blue shades.

4. As a new product, the specific new anthraquinone dyestuff obtainable by sulfonating the condensation product of brominated 1:5-amidoöxyanthraquinone with anilin, representing when dry and pulverized a dark-blue powder easily soluble in water with a pure-blue color, which becomes bluish violet on adding carbonate of soda or of caustic soda, being precipitated from its aqueous solution by common salt or by dilute mineral acids, being dissolved by concentrated sulfuric acid, yielding a blue color, changed into red by a small quantity of water, while by a larger quantity of water a blue precipitate is separated out.

In testimony that we claim the foregoing as our invention we have signed our names in presence of two subscribing witnesses.

EDUARD HEPP.
CHRISTOPH HARTMANN.

Witnesses:
ALFRED BRISBOIS,
JEAN GRUND.